July 4, 1944. M. D. HEYMAN 2,352,632
TRANSFER ARM
Filed Sept. 9, 1942 2 Sheets-Sheet 1
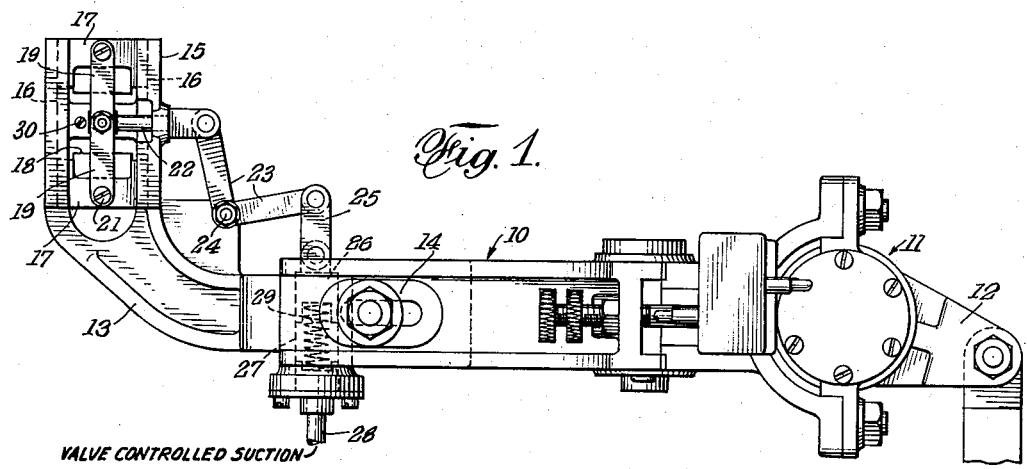
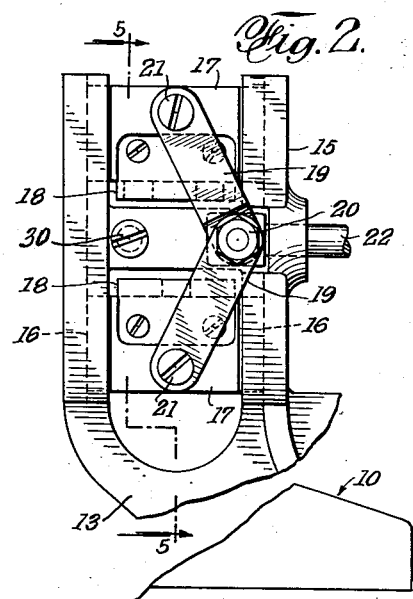
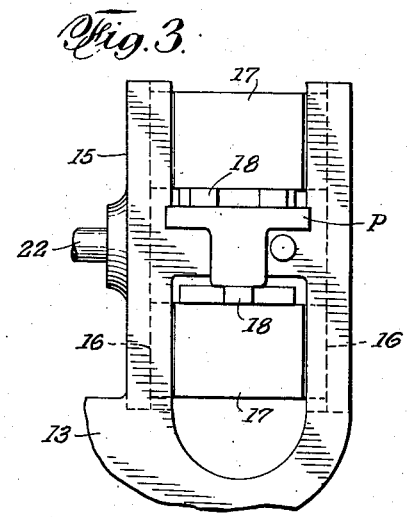
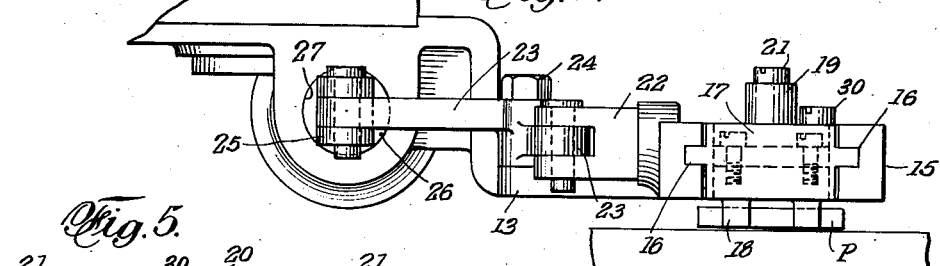
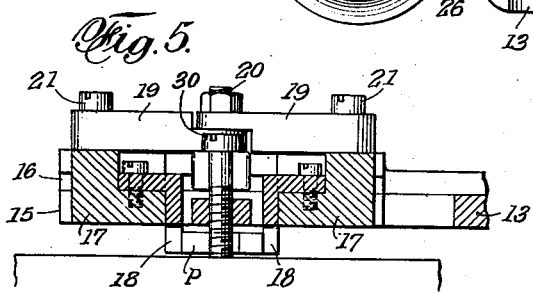
INVENTOR
MOSES D. HEYMAN
BY
Hyman Jackman
ATTORNEY July 4, 1944.                M. D. HEYMAN                2,352,632
TRANSFER ARM
Filed Sept. 9, 1942                2 Sheets-Sheet 2
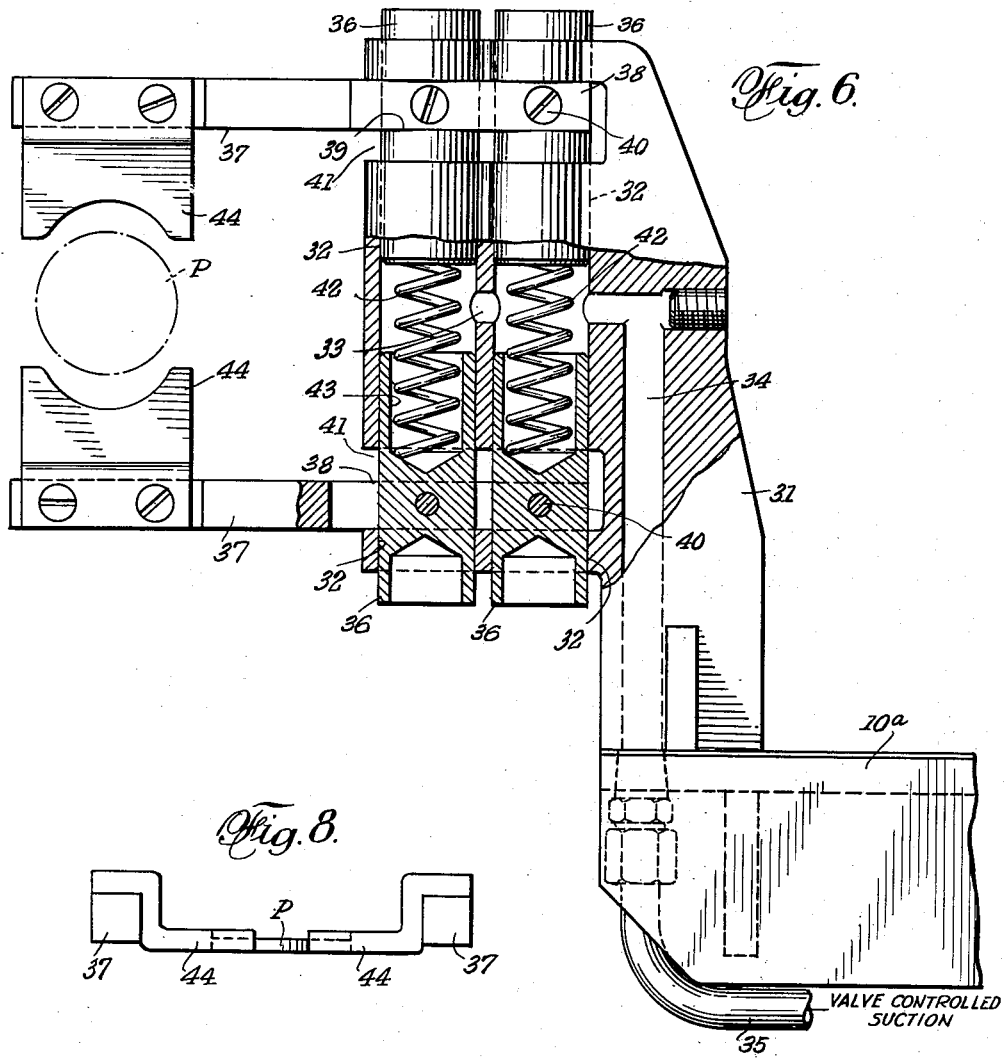
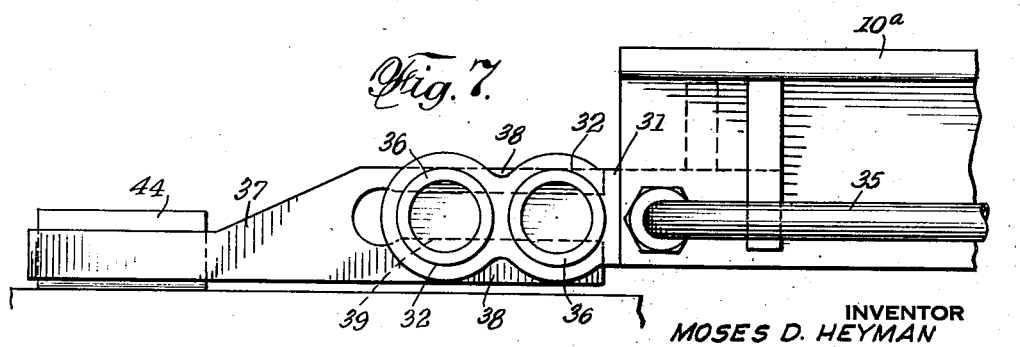
INVENTOR
MOSES D. HEYMAN

Patented July 4, 1944

2,352,632

UNITED STATES PATENT OFFICE 2,352,632

TRANSFER ARM

Moses D. Heyman, Cedarhurst, N. Y., assignor of one-half to Irene K. Heyman, Cedarhurst, N. Y.

Application September 9, 1942, Serial No. 457,785

6 Claims. (Cl. 294—86)

This invention relates to means for effecting a transfer of a work piece from one point of a feed mechanism to a die or to another point where an operation is to be performed on said work piece, this application being a continuation-in-part of my pending application Ser. #373,577, now Patent No. 2,322,294, issued June 22, 1943.

In the mentioned pending application there is described a feeding mechanism incorporating a support upon which work pieces are deposited at a station thereon remote from the die of a power press, means for moving said support to bring said station and the work piece thereon nearer to said die, and means for effecting a transfer of the work piece from the latter position of the station to the die. The present invention deals with the latter transfer means and more generally seeks to provide novel means for transporting a work piece from one point to another.

More specifically, the invention seeks to emulate the fingers of the human hand by grasping a work piece in a set of fingers, lifting the piece off a support, moving it to another point such as a die, and depositing it on said die in proper relation to the die cavity.

The various features relating to synchronizing the movement of the transfer member with the initial feed movements and with the operation of the power press, are disclosed in detail in my pending application, the present application dealing only with the mentioned novel transfer means, and with novel means for operating the same.

The invention, therefore, has for its primary object the provision of accurate transfer mechanism of the character indicated.

Another object is to provide mechanical means vacuum operated for effecting the transfer of a work piece between two points.

The foregoing objects and other objects, features and advantages of the invention are realized in the structures shown in the accompanying drawings in which exemplary forms of the invention are disclosed.

In the drawings:

Figure 1 is a top plan view of one form of transfer arm according to the invention.

Figure 2 is an enlarged plan view of the work piece grasping portion of the transfer arm shown in Figure 1.

Figure 3 is a bottom plan view thereof.

Figure 4 is an edge-view thereof as viewed from the top of Figure 1.

Figure 5 is a cross-sectional view as taken on the plane of the line 5—5 of Figure 2.

Figure 6 is a fragmentary plan view, partly in cross-section, of another form of transfer arm.

Figure 7 is an edge view thereof.

Figure 8 is a side view as seen from the left of Figure 6.

Reference is now made, in greater detail, to Figures 1 to 5 inclusive.

The transfer arm, generally designated 10, as disclosed in the mentioned application, is carried by a column or post 11, which through an arm 12 and connecting mechanism, not shown, is oscillated to cause oscillations of the transfer arm as can be well understood.

A particularly valuable feature of the disclosed type of arm is that two or more work pieces may be picked up thereby for sub-assembly in a die, a safe operation by the present mechanism but extremely hazardous heretofore.

The arm member 10 is preferably fitted with an extension 13, adjustably mounted as by means of a slot and bolt connection 14, and, depending on its relation with the transfer station and the die, formed with an off-set portion 15. The latter portion is preferably provided with guideways 16, in which are disposed slides 17 upon each of which is removably carried a work piece grasping member 18. Links 19 are pivotally connected to each other at 20 and each link has pivotal connection at 21 to a slide 17. The links are thus arranged as a toggle and movement imparted to them at their connecting pivot 20, will cause a lesser but powerful movement of the slides 17 towards each other.

This movement of the slides is imparted through a rod 22, connected to a bellcrank lever 23, pivoted to the extension 13 at 24, and connected by a link 25 to a piston 26 operating in a cylinder 27. A vacuum or suction connection is made to the cylinder at 28. A spring 29 within the cylinder serves to hold the piston in outermost condition when the suction is not applied and in this condition holds the slides 17 and the grasping members 18 apart until suction is applied to the cylinder 27. This condition is shown in Fig. 1. When suction is applied to the cylinder, the piston 26 will be drawn inwardly to operate the system of links and levers to break the toggle and to draw the slides towards each other as shown in Fig. 2. A pin 30 is provided to project into the area which would be occupied by a work piece P that might be in the path of vertical movement of the arm 10.

The grasping arm extension 13 has been so designed as to render it applicable for the transfer of a great number of differently shaped work pieces, it only being necessary to change the grasping members 18 which are designed for each size and shape of work piece or work pieces to be acted on.

The above described structure is quite effective for the purpose intended. However, in order to obtain quite rapid oscillatory movement of the transfer arm and to overcome momentum forces it is found necessary to drastically reduce the weight of said arm. In addition to extreme simplification of the arm, resort is also had to structural sections and welding together of parts as exemplified in Figs. 6 to 8 of the drawings.

As shown, the arm 10ª preferably comprises a structural angle member of great strength yet light weight. Upon said arm there is mounted, as by brazing or welding, a cylinder block 31. Said block, as will be noted, is of sturdy yet light design and incorporates opposed pairs of cylinders 32 which are inter-communicated as by a port 33. A passage 34 connects with said cylinders, said passage, through a tube 35, being connected with a suitable suction device (not shown).

The cylinders 32 are fitted with pistons 36 which are thus arranged in opposed pairs. Each pair of pistons, as contemplated, is connected by a jaw member 37, said connection being accomplished as by arranging arms 38 on each side of each pair of pistons and securing the same as in notches 39 by means of screws 40. To accommodate the arms 38, the cylinder block 31 is formed with slots 41 which are amply wide to permit the jaws 37 to move towards each other when suction is applied through the tube 35 and away from each other under urgency of springs 42 disposed in hollows 43 in the pistons 36.

The structure is completed by the mounting of false jaws 44, one on each jaw 37. Said false jaws are so arranged and designed as to readily function to grasp a work piece P between them.

To further lighten the mechanism, the outer ends of the pistons are drilled as at 45. Other parts of the arm may be similarly treated.

The compactness and simplicity of this form of the invention appears quite evident, the use of pairs of pistons to obtain a flatter edgewise shape being a special feature of this form. This structure, it will be noted, is so arranged that a work piece is always in full view, thus facilitating adjustment of the arm. Further, should a press punch, due to failure to maintain synchrony, strike the jaws 44, they, of course, would be damaged but the loss entailed would be small compared to the smashing, for instance, of a mechanism such as shown in Fig. 2.

While the invention has been described with respect to the two illustrated embodiments, it should be apparent that the principles thereof as revealed herein, may be incorporated in variations and modifications which are, therefore, within the spirit and scope of the invention as claimed.

Having thus described my invention, what I claim as new and desire to secure by Letters Patent, is:

1. A transfer arm comprising a pair of sliding work piece grasping members, vacuum cylinder and piston means connected with said grasping members for drawing them together, and spring means operable upon breaking of the vacuum in the mentioned cylinder means for urging said members apart.

2. A transfer arm comprising a pair of sliding work piece grasping members, vacuum operated means for drawing said grasping members toward each other to grasp a work piece therebetween, and spring means operable upon breaking the vacuum in the vacuum operated means for urging said members apart.

3. A transfer arm comprising a pair of sliding work piece grasping members, vacuum operated means comprising opposed pistons arranged in cylinders for drawing said grasping members toward each other to grasp a work piece therebetween, and spring means disposed within hollows formed in said pistons, said means being operable upon breaking the vacuum in the mentioned cylinders for urging said members apart.

4. A transfer arm of the type indicated comprising an arm element, a cylinder block carried by said arm element, pistons carried by said block, work piece grasping jaws carried by said pistons, means for creating a vacuum in said cylinders whereby said jaws are moved toward each other, and spring means for urging said jaws apart.

5. A transfer arm of the type indicated comprising an arm element, a cylinder block carried by said arm element, said cylinder block having two cylinders therein in side by side relation, pairs of opposed pistons in said cylinders, work piece grasping jaws carried by said pistons, means for creating a vacuum in said cylinders whereby said jaws are moved toward each other, and spring means for urging said jaws apart.

6. A transfer arm of the type indicated comprising an arm element, a cylinder block carried by said arm element, said cylinder block having two cylinders therein in side by side relation, pairs of opposed pistons in said cylinders, a work piece grasping jaw carried by each pair of pistons, means for creating a vacuum in said cylinders whereby said jaws are moved toward each other, and spring means for urging said jaws apart.

MOSES D. HEYMAN.